(12) United States Patent
Cimpu et al.

(10) Patent No.: US 12,245,217 B2
(45) Date of Patent: Mar. 4, 2025

(54) METHOD FOR DYNAMIC SPECTRUM SHARING FOR LOOSELY COUPLED SYSTEMS

(71) Applicant: Telefonaktiebolaget LM Ericsson (publ), Stockholm (SE)

(72) Inventors: Virgil Cimpu, Ottawa (CA); Michael Petras, Ottawa (CA); Tomas Norling, Solna (SE); Franz Heiser, Järfälla (SE); Tobias Lindquist, Spånga (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 203 days.

(21) Appl. No.: 17/761,017

(22) PCT Filed: Oct. 25, 2019

(86) PCT No.: PCT/IB2019/059182
§ 371 (c)(1),
(2) Date: Mar. 16, 2022

(87) PCT Pub. No.: WO2021/079178
PCT Pub. Date: Apr. 29, 2021

(65) Prior Publication Data
US 2022/0353876 A1    Nov. 3, 2022

(51) Int. Cl.
*H04W 16/14* (2009.01)
*H04W 72/12* (2023.01)
*H04W 88/10* (2009.01)

(52) U.S. Cl.
CPC ........ *H04W 72/1215* (2013.01); *H04W 16/14* (2013.01); *H04W 88/10* (2013.01)

(58) Field of Classification Search
CPC ..... H04W 16/14; H04W 88/10; H04W 72/23; H04W 72/1215; H04L 5/00
See application file for complete search history.

(56) References Cited

U.S. PATENT DOCUMENTS 9,603,124 B2     3/2017  Ahmadi
11,160,057 B2 *  10/2021 Lin .................. H04W 72/21
(Continued)

FOREIGN PATENT DOCUMENTS

WO    2019/142175 A1    7/2019

OTHER PUBLICATIONS

International Search Report and Written Opinion of the International Searching Authority dated Jun. 24, 2020 issued in PCT Application No. PCT/IB2019/059182, consisting of 15 pages.
(Continued)

*Primary Examiner* — Hassan A Phillips
*Assistant Examiner* — Prenell P Jones
(74) *Attorney, Agent, or Firm* — Sonoda & Kobayashi Intellectual Property Law; Sarvajit S. Patil

(57) ABSTRACT

According to one or more embodiments, a first network node of a first radio access technology, RAT, configured to communicate with a second network node of a second RAT different from the first RAT is provided. The first network node includes processing circuitry configured to: schedule a physical resource block, PRB, in a predetermined frequency carrier range where the scheduling starts from a predefined frequency location in the predetermined frequency carrier range, receive an indication that the PRB has been scheduled by the second network node, and responsive to the received indication, discard the PRB scheduled by the first network node if the PRB is located outside of a first predetermined partition of radio resources allocated to the first network node.

23 Claims, 8 Drawing Sheets

(56) References Cited

U.S. PATENT DOCUMENTS

| | | | |
|---|---|---|---|
| 12,034,511 B2* | 7/2024 | Cirik | H04W 80/02 |
| 2001/0025310 A1* | 9/2001 | Krishnamurthy | H04L 47/724 |
| | | | 709/224 |
| 2018/0070367 A1* | 3/2018 | Fujishiro | H04W 52/0216 |
| 2018/0070369 A1 | 3/2018 | Papasakellariou | |
| 2019/0109697 A1 | 4/2019 | Lee et al. | |
| 2019/0208530 A1 | 7/2019 | Gao et al. | |
| 2019/0253197 A1* | 8/2019 | Babaei | H04L 1/188 |
| 2019/0268127 A1 | 8/2019 | Hosseini et al. | |
| 2020/0236710 A1* | 7/2020 | Sun | H04L 5/0016 |
| 2020/0351857 A1* | 11/2020 | Bharadwaj | H04L 5/0051 |
| 2022/0150756 A1* | 5/2022 | Garcia | H04L 5/001 |
| 2022/0377610 A1* | 11/2022 | Garcia | H04W 16/10 |

OTHER PUBLICATIONS

Written Opinion of the International Preliminary Examining Authority dated Oct. 5, 2021 issued in PCT Application No. PCT/IB2019/059182, consisting of 8 pages.

International Preliminary Report on Patentability dated Jan. 20, 2022 issued in PCT Application No. PCT/IB2019/059182, consisting of 20 pages.

European Communication Pursuant to Article 94(3) EPC dated May 10, 2024 issued in corresponding European Application No. 19797808.3, consisting of 6 pages.

* cited by examiner

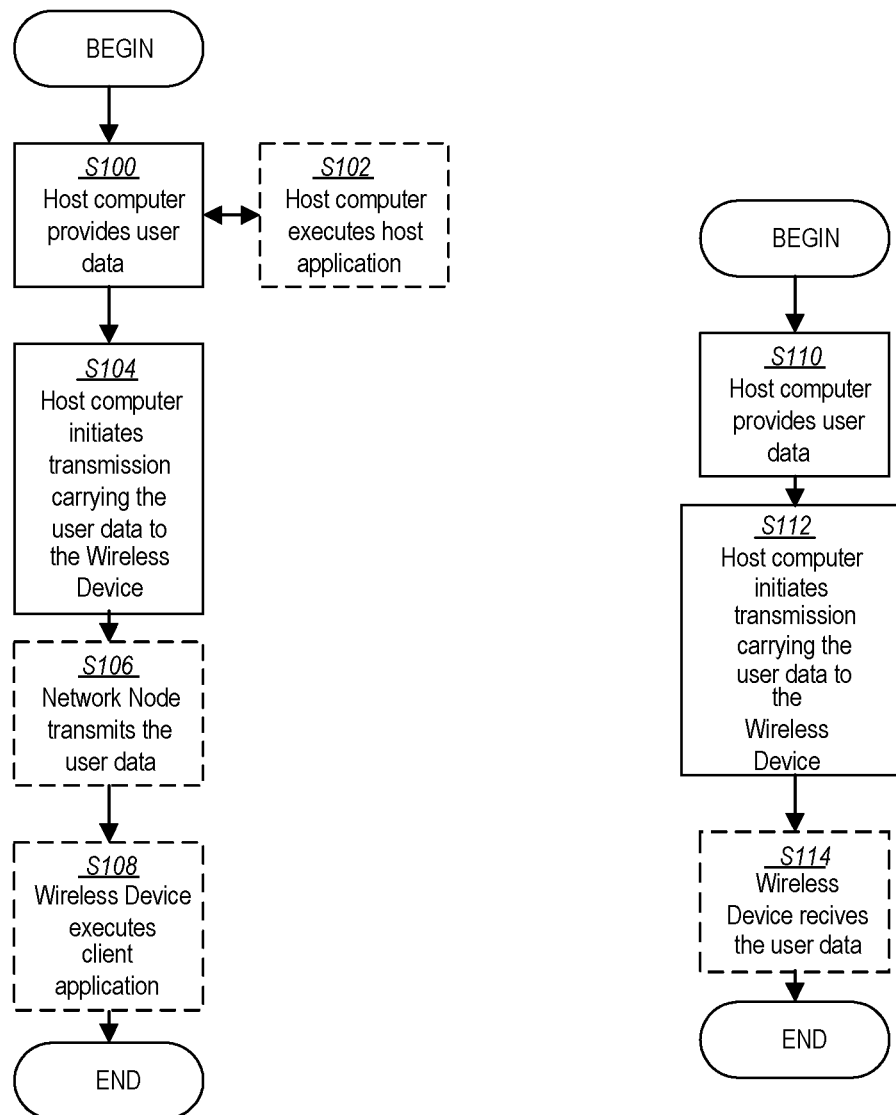

METHOD FOR DYNAMIC SPECTRUM SHARING FOR LOOSELY COUPLED SYSTEMS

CROSS-REFERENCE TO RELATED APPLICATIONS

This application is a Submission Under 35 U.S.C. § 371 for U.S. National Stage Patent Application of International Application Number: PCT/IB2019/059182, filed Oct. 25, 2019 entitled "METHOD FOR DYNAMIC SPECTRUM SHARING FOR LOOSELY COUPLED SYSTEMS," the entirety of which is incorporated herein by reference.

TECHNICAL FIELD

Wireless communication and in particular, at least supporting dynamic spectrum sharing (DSS) between loosely coupled network nodes such as between a first network node of a first radio access technology (RAT) and a second network node of a second RAT.

BACKGROUND

With the introduction of New Radio (NR, also referred to as 5$^{th}$ Generation (5G)) and the limited spectrum availability for 5G mid-band, network operators have the task of supporting the new NR wireless devices while still catering to Long Term Evolution (LTE, also referred to as 4G) wireless device. One approach is to address this situation of simultaneously supported both radio access technologies is to dynamically share the same spectrum for NR and LTE wireless devices. This may be referred to as Dynamic Spectrum Sharing (DSS).

In particular, DSS was introduced in Third Generation Partnership Project (3GPP) Release (Rel) 15 and 16 to solve the problem of simultaneously supporting NR and LTE wireless devices in the same channel. DSS requires a high level of scheduling synchronization between the network nodes, i.e., between eNB and gNB, which requires low latency/high bandwidth connection between the network nodes. The extensive signaling in existing DSS disadvantageously increases system complexity and waste limited network resources.

SUMMARY

Some embodiments advantageously provide a method and system for at least supporting dynamic spectrum sharing (DSS) between loosely coupled network nodes such as between a first network node of a first radio access technology (RAT) and a second network node of a second RAT. In one or more embodiments, as used herein, "loosely coupled" may refer to an approach to interconnecting network entities in a system or network so that those network entities depend on each other to the least extend practicable. "Coupling" may refer to a degree of direct knowledge that one network element has of another network element.

In one or more embodiments, the teachings of the disclosure may be applied in the case where there are two physical network nodes implementing eNB and gNB, respectively, and there is limited bandwidth/higher latency connection between the two network nodes.

In one or more embodiments of the disclosure introduce a method of supporting DSS between loosely coupled network nodes of different radio access technologies (e.g., eNB, gNB), without the need of highly coordinated scheduling between the two network nodes. Each network node may schedule the radio resources independently of the other network node. Each network node may allocate one or more partitions of radio resources.

The resource partitioning between the network node of the first RAT (e.g., LTE) and the network node of the second RAT (e.g., NR) may slowly change based on statistical usage history. To facilitate independent scheduling between the two network nodes, each network node may schedule physical resource blocks (PRBs), e.g., resources, from the opposite end of the carrier frequency range. For each slot, the network nodes report the amount/quantity of scheduled resources. The network nodes may discard any scheduled data PRBs, outside of its own allocated partition, that are in conflict, i.e., that may have been scheduled by the other network node.

Therefore, the teachings described in the disclosure provide a less complex (when compared to existing systems) but dynamic way of scheduling resources for network nodes of at least two different RATs such as a network node of a first RAT, e.g., eNB, and a network node of a second RAT, e.g., gNB, that dynamically share the same spectrum. There may be no need for coordinated scheduling between the network nodes, with only one short message being exchanged between the network nodes per slot in order to solve scheduling conflicts. This allows minimum coupling between the systems which reduces the signaling overhead and/or help conserve system resources. The teachings described herein may be applicable, for example, when the transport network between the network nodes has relatively low bandwidth and/or medium-high delay.

According to one aspect of the disclosure, a first network node of a first radio access technology, RAT, configured to communicate with a second network node of a second RAT different from the first RAT is provided. The first network node includes processing circuitry configured to schedule a physical resource block, PRB, in a predetermined frequency carrier range where the scheduling starts from a predefined frequency location in the predetermined frequency carrier range, receive an indication that the PRB has been scheduled by the second network node, and responsive to the received indication, discard the PRB scheduled by the first network node if the PRB is located outside of a first predetermined partition of radio resources allocated to the first network node.

According to one or more embodiments of this aspect, the processing circuitry is further configured to, if the PRB is located within the first predetermined partition of radio resources, cause transmission using the PRB scheduled by the first network node. According to one or more embodiments of this aspect, the scheduling of the PRB in the predetermined frequency carrier range is independent of the scheduling of the PRB by the second network node. According to one or more embodiments of this aspect, the processing circuitry is further configured to, if the PRB is located outside the first partition, and if the indication that the PRB has been scheduled by the second network node has not been received within a predetermined timeout period, discard the PRB scheduled by the first network node. According to one or more embodiments of this aspect, the processing circuitry is further configured to: receive an indication that the PRB has not been scheduled by the second network node, and responsive to the received indication, cause transmission using the PRB scheduled by the first network node.

According to one or more embodiments of this aspect, the predetermined frequency carrier range includes at least two predetermined partitions of radio resources including the first predetermined partition of radio resources where the at least two predetermined partitions of radio resources are non-overlapping partitions. According to one or more embodiments of this aspect, the at least two predetermined partitions of radio resource are determined based at least in part on resource usage during a predefined time period. According to one or more embodiments of this aspect, the predefined time period corresponds to one of N transmissions for a wireless device and N slots.

According to one or more embodiments of this aspect, the at least two predetermined partitions are determined for every predefined time period. According to one or more embodiments of this aspect, the processing circuitry is further configured to provide an indication of the scheduling of the PRB by the first network node to the second network node. According to one or more embodiments of this aspect, the predefined frequency location in the predetermined frequency carrier range corresponds to one end of the predetermined frequency carrier range where the scheduling by the first network node progress toward an opposite end of the predetermined frequency carrier range.

According to another aspect of the disclosure, a method implemented by a first network node of a first radio access technology, RAT, configured to communicate with a second network node of a second RAT different from the first RAT is provided. A physical resource block, PRB, is scheduled in a predetermined frequency carrier range where the scheduling starts from a predefined frequency location in the predetermined frequency carrier range. An indication that the PRB has been scheduled by the second network node is received. Responsive to the indication, the PRB scheduled by the first network node is discarded if the PRB is located outside of a first predetermined partition of radio resources allocated to the first network node.

According to one or more embodiments of this aspect, if the PRB is located within the first predetermined partition of radio resources, transmission is caused using the PRB scheduled by the first network node. According to one or more embodiments of this aspect, the scheduling of the PRB in the predetermined frequency carrier range is independent of the scheduling of the PRB by the second network node. According to one or more embodiments of this aspect, if the PRB is located outside the first partition, and if the indication that the PRB has been scheduled by the second network node has not been received within a predetermined timeout period, the PRB scheduled by the first network node is discarded. According to one or more embodiments of this aspect, the processing circuitry is further configured to: receive an indication that the PRB has not been scheduled by the second network node, and responsive to the received indication, cause transmission using the PRB scheduled by the first network node.

According to one or more embodiments of this aspect, the predetermined frequency carrier range includes at least two predetermined partitions of radio resources including the first predetermined partition of radio resources where the at least two predetermined partitions of radio resources are non-overlapping partitions. According to one or more embodiments of this aspect, the at least two predetermined partitions of radio resource are determined based at least in part on resource usage during a predefined time period.

According to one or more embodiments of this aspect, the predefined time period corresponds to one of N transmissions for a wireless device and N slots. According to one or more embodiments of this aspect, the at least two predetermined partitions are determined for every predefined time period. According to one or more embodiments of this aspect, an indication of the scheduling of the PRB is provided by the first network node to the second network node. According to one or more embodiments of this aspect, the predefined frequency location in the predetermined frequency carrier range corresponds to one end of the predetermined frequency carrier range where the scheduling by the first network node progresses toward an opposite end of the predetermined frequency carrier range.

According to another aspect of the disclosure, a computer readable medium is configured to store instructions that, when executed by a processor, cause the processor to: schedule, by a first network node, a physical resource block, PRB, in a predetermined frequency carrier range where the scheduling starts from a predefined frequency location in the predetermined frequency carrier range, receive an indication that the PRB has been scheduled by a second network node, and responsive to the indication, discard the PRB scheduled by the first network node if the PRB is located outside of a first predetermined partition of radio resources allocated to the first network node.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein:

FIG. 3 is a flowchart illustrating exemplary methods implemented in a communication system including a host computer, a network node and a wireless device for executing a client application at a wireless device according to some embodiments of the present disclosure;

FIG. 4 is a flowchart illustrating exemplary methods implemented in a communication system including a host computer, a network node and a wireless device for receiving user data at a wireless device according to some embodiments of the present disclosure;

DETAILED DESCRIPTION

Figure 1:
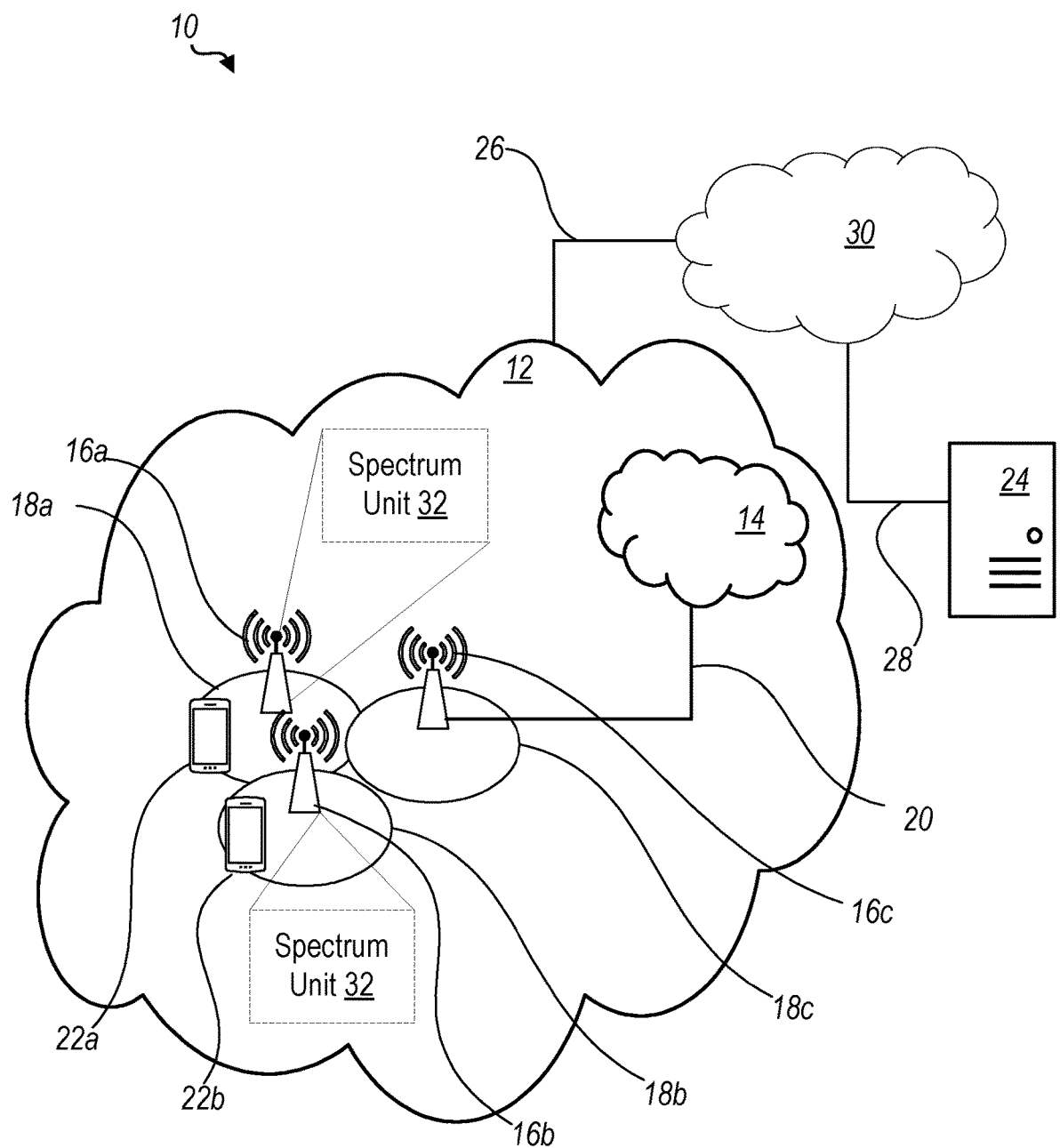
FIG. 1 is a schematic diagram of an exemplary network architecture illustrating a communication system connected via an intermediate network to a host computer according to the principles in the present disclosure.

Before describing in detail exemplary embodiments, it is noted that the embodiments reside primarily in combinations of apparatus components and processing steps related to at least supporting dynamic spectrum sharing (DSS) between loosely coupled network nodes such as between a first network node of a first radio access technology (RAT) and a second network node of a second RAT. For example, one or more embodiments described herein provide a method of at least supporting DSS between loosely coupled eNB and gNB, without the need of coordinated scheduling between the two network nodes. This method may be useful when the eNB and gNB network nodes are implemented on different software (SW) and/or hardware (HW) platforms with limited scheduling synchronization opportunities. Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein. Like numbers refer to like elements throughout the description.

As used herein, relational terms, such as "first" and "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication.

In some embodiments described herein, the term "coupled," "connected," and the like, may be used herein to indicate a connection, although not necessarily directly, and may include wired and/or wireless connections.

The term "network node" used herein can be any kind of network node comprised in a radio network which may further comprise any of base station (BS), radio base station, base transceiver station (BTS), base station controller (BSC), radio network controller (RNC), g Node B (gNB), evolved Node B (eNB or eNodeB), Node B, multi-standard radio (MSR) radio node such as MSR BS, multi-cell/multicast coordination entity (MCE), integrated access and backhaul (IAB) node, relay node, donor node controlling relay, radio access point (AP), transmission points, transmission nodes, Remote Radio Unit (RRU) Remote Radio Head (RRH), a core network node (e.g., mobile management entity (MME), self-organizing network (SON) node, a coordinating node, positioning node, MDT node, etc.), an external node (e.g., 3rd party node, a node external to the current network), nodes in distributed antenna system (DAS), a spectrum access system (SAS) node, an element management system (EMS), etc. The network node may also comprise test equipment. The term "radio node" used herein may be used to also denote a wireless device (WD) such as a wireless device (WD) or a radio network node.

In some embodiments, the non-limiting terms wireless device (WD) or a user equipment (UE) are used interchangeably. The WD herein can be any type of wireless device capable of communicating with a network node or another WD over radio signals, such as wireless device (WD). The WD may also be a radio communication device, target device, device to device (D2D) WD, machine type WD or WD capable of machine to machine communication (M2M), low-cost and/or low-complexity WD, a sensor equipped with WD, Tablet, mobile terminals, smart phone, laptop embedded equipped (LEE), laptop mounted equipment (LME), USB dongles, Customer Premises Equipment (CPE), an Internet of Things (IoT) device, or a Narrowband IoT (NB-IOT) device, etc.

Also, in some embodiments the generic term "radio network node" is used. It can be any kind of a radio network node which may comprise any of base station, radio base station, base transceiver station, base station controller, network controller, RNC, evolved Node B (eNB), Node B, gNB, Multi-cell/multicast Coordination Entity (MCE), IAB node, relay node, access point, radio access point, Remote Radio Unit (RRU) Remote Radio Head (RRH).

An indication generally may explicitly and/or implicitly indicate the information it represents and/or indicates. Implicit indication may for example be based on position and/or resource used for transmission. Explicit indication may for example be based on a parametrization with one or more parameters, and/or one or more index or indices, and/or one or more bit patterns representing the information.

Transmitting in downlink may pertain to transmission from the network or network node to the terminal. Transmitting in uplink may pertain to transmission from the terminal to the network or network node. Transmitting in sidelink may pertain to (direct) transmission from one terminal to another. Uplink, downlink and sidelink (e.g., sidelink transmission and reception) may be considered communication directions. In some variants, uplink and downlink may also be used to described wireless communication between network nodes, e.g. for wireless backhaul and/or wired backhaul and/or relay communication and/or (wireless) network communication for example between base stations or similar network nodes, in particular communication terminating at such. It may be considered that backhaul and/or relay communication and/or network communication is implemented as a form of sidelink or uplink communication or similar thereto.

The term radio access technology, or RAT, may refer to any RAT, e.g., Universal Terrestrial Radio Access (UTRA), Evolved Universal Terrestrial Radio Access (E-UTRA), narrow band internet of things (NB-IoT), WiFi, Bluetooth, next-generation RAT (NR), 4G (LTE), 5G (New Radio (NR)), etc. Any of the first and the second nodes may be capable of supporting a single or multiple RATs.

The term resource used herein may correspond to any type of physical resource or radio resource expressed in terms of length of time and/or frequency. Signals are transmitted or received by a radio node over a time resource. Examples of time resources are one or more of: symbol, time slot, subframe, radio frame, Transmission Time Interval (TTI), interleaving time, etc.

Note that although terminology from one particular wireless system, such as, for example, 3GPP LTE and/or New Radio (NR), may be used in this disclosure, this should not be seen as limiting the scope of the disclosure to only the aforementioned system. Other wireless systems, including without limitation Wide Band Code Division Multiple Access (WCDMA), Worldwide Interoperability for Microwave Access (WiMax), Ultra Mobile Broadband (UMB) and Global System for Mobile Communications (GSM), may also benefit from exploiting the ideas covered within this disclosure.

Note further, that functions described herein as being performed by a wireless device or a network node may be distributed over a plurality of wireless devices and/or network nodes. In other words, it is contemplated that the functions of the network node and wireless device described herein are not limited to performance by a single physical device and, in fact, can be distributed among several physical devices.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Embodiments provide at least supporting dynamic spectrum sharing (DSS) between loosely coupled network nodes such as between a first network node of a first radio access technology (RAT) and a second network node of a second RAT.

Referring now to the drawing figures, in which like elements are referred to by like reference numerals, there is shown in FIG. 1 a schematic diagram of a communication system 10, according to an embodiment, such as a 3GPP-type cellular network that may support standards such as LTE and/or NR (5G), which comprises an access network 12, such as a radio access network, and a core network 14. The access network 12 comprises a plurality of network nodes 16a, 16b, 16c (referred to collectively as network nodes 16), such as NB s, eNB s, gNBs or other types of wireless access points, each defining a corresponding coverage area 18a, 18b, 18c (referred to collectively as coverage areas 18). Each network node 16a, 16b, 16c is connectable to the core network 14 over a wired or wireless connection 20. A first wireless device (WD) 22a located in coverage area 18a is configured to wirelessly connect to, or be paged by, the corresponding network node 16a. In one or more embodiments, network node 16a is a first RAT network node 16a such as, for example, a LTE network node (e.g., eNB) and network node 16b is a second RAT network node 16b such as, for example, a NR network node (e.g., gNB).

A second WD 22b in coverage area 18b is wirelessly connectable to the corresponding network node 16b. While a plurality of WDs 22a, 22b (collectively referred to as wireless devices 22) are illustrated in this example, the disclosed embodiments are equally applicable to a situation where a sole WD is in the coverage area or where a sole WD is connecting to the corresponding network node 16. Note that although only two WDs 22 and three network nodes 16 are shown for convenience, the communication system may include many more WDs 22 and network nodes 16.

Also, it is contemplated that a WD 22 can be in simultaneous communication and/or configured to separately communicate with more than one network node 16 and more than one type of network node 16. For example, a WD 22 can have dual connectivity with a network node 16 that supports LTE and the same or a different network node 16 that supports NR. As an example, WD 22 can be in communication with an eNB for LTE/E-UTRAN and a gNB for NR/NG-RAN.

The communication system 10 may itself be connected to a host computer 24, which may be embodied in the hardware and/or software of a standalone server, a cloud-implemented server, a distributed server or as processing resources in a server farm. The host computer 24 may be under the ownership or control of a service provider, or may be operated by the service provider or on behalf of the service provider. The connections 26, 28 between the communication system 10 and the host computer 24 may extend directly from the core network 14 to the host computer 24 or may extend via an optional intermediate network 30. The intermediate network 30 may be one of, or a combination of more than one of, a public, private or hosted network. The intermediate network 30, if any, may be a backbone network or the Internet. In some embodiments, the intermediate network 30 may comprise two or more sub-networks (not shown).

The communication system of FIG. 1 as a whole enables connectivity between one of the connected WDs 22a, 22b and the host computer 24. The connectivity may be described as an over-the-top (OTT) connection. The host computer 24 and the connected WDs 22a, 22b are configured to communicate data and/or signaling via the OTT connection, using the access network 12, the core network 14, any intermediate network 30 and possible further infrastructure (not shown) as intermediaries. The OTT connection may be transparent in the sense that at least some of the participating communication devices through which the OTT connection passes are unaware of routing of uplink and downlink communications. For example, a network node 16 may not or need not be informed about the past routing of an incoming downlink communication with data originating from a host computer 24 to be forwarded (e.g., handed over) to a connected WD 22a. Similarly, the network node 16 need not be aware of the future routing of an outgoing uplink communication originating from the WD 22a towards the host computer 24.

A network node 16 is configured to include a spectrum unit 32 which is configured to perform one or more network node 16 functions as described herein such as with respect to at least supporting dynamic spectrum sharing (DSS) between loosely coupled network nodes such as between a first network node of a first RAT and a second network node of a second RAT.

Example implementations, in accordance with an embodiment, of the WD 22, network node 16 and host computer 24 discussed in the preceding paragraphs will now be described with reference to FIG. 2. In a communication system 10, a host computer 24 comprises hardware (HW) 38 including a communication interface 40 configured to set up and maintain a wired or wireless connection with an interface of a different communication device of the communication system 10. The host computer 24 further comprises processing circuitry 42, which may have storage and/or processing capabilities. The processing circuitry 42 may include a processor 44 and memory 46. In particular, in addition to or instead of a processor, such as a central processing unit, and memory, the processing circuitry 42 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 44 may be configured to access (e.g., write to and/or read from) memory 46, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Processing circuitry 42 may be configured to control any of the methods and/or processes described herein and/or to cause such methods, and/or processes to be performed, e.g., by host computer 24. Processor 44 corresponds to one or more processors 44 for performing host computer 24 functions described herein. The host computer 24 includes memory 46 that is configured to store data, programmatic software code and/or other information described herein. In some embodiments, the software 48 and/or the host application 50 may include instructions that, when executed by the processor 44 and/or processing circuitry 42, causes the processor 44 and/or processing circuitry 42 to perform the processes described herein with respect to host computer 24. The instructions may be software associated with the host computer 24.

The software 48 may be executable by the processing circuitry 42. The software 48 includes a host application 50. The host application 50 may be operable to provide a service to a remote user, such as a WD 22 connecting via an OTT connection 52 terminating at the WD 22 and the host computer 24. In providing the service to the remote user, the host application 50 may provide user data which is transmitted using the OTT connection 52. The "user data" may be data and information described herein as implementing the described functionality. In one embodiment, the host computer 24 may be configured for providing control and functionality to a service provider and may be operated by the service provider or on behalf of the service provider. The processing circuitry 42 of the host computer 24 may enable the host computer 24 to observe, monitor, control, transmit to and/or receive from the network node 16 and or the wireless device 22. The processing circuitry 42 of the host computer 24 may include an information unit 54 configured to enable the service provider to one or more of provide, process, determine, signal, communicate, store, transmit, receive, forward, relay, etc. information related to at least supporting dynamic spectrum sharing (DSS) between loosely coupled network nodes such as between a first network node of a first RAT and a second network node of a second RAT.

The communication system 10 further includes a network node 16 provided in a communication system 10 and including hardware 58 enabling it to communicate with the host computer 24 and with the WD 22. The hardware 58 may include a communication interface 60 for setting up and maintaining a wired or wireless connection with an interface of a different communication device of the communication system 10, as well as a radio interface 62 for setting up and maintaining at least a wireless connection 64 with a WD 22 located in a coverage area 18 served by the network node 16. The radio interface 62 may be formed as or may include, for example, one or more RF transmitters, one or more RF receivers, and/or one or more RF transceivers. The communication interface 60 may be configured to facilitate a connection 66 to the host computer 24. The connection 66 may be direct or it may pass through a core network 14 of the communication system 10 and/or through one or more intermediate networks 30 outside the communication system 10.

In the embodiment shown, the hardware 58 of the network node 16 further includes processing circuitry 68. The processing circuitry 68 may include a processor 70 and a memory 72. In particular, in addition to or instead of a processor, such as a central processing unit, and memory, the processing circuitry 68 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 70 may be configured to access (e.g., write to and/or read from) the memory 72, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the network node 16 further has software 74 stored internally in, for example, memory 72, or stored in external memory (e.g., database, storage array, network storage device, etc.) accessible by the network node 16 via an external connection. The software 74 may be executable by the processing circuitry 68. The processing circuitry 68 may be configured to control any of the methods and/or processes described herein and/or to cause such methods, and/or processes to be performed, e.g., by network node 16. Processor 70 corresponds to one or more processors 70 for performing network node 16 functions described herein. The memory 72 is configured to store data, programmatic software code and/or other information described herein. In some embodiments, the software 74 may include instructions that, when executed by the processor 70 and/or processing circuitry 68, causes the processor 70 and/or processing circuitry 68 to perform the processes described herein with respect to network node 16. For example, processing circuitry 68 of the network node 16 may include spectrum unit 32 configured to perform one or more network node 16 functions described herein such as with respect to at least supporting dynamic spectrum sharing (DSS) between loosely coupled network nodes such as between a first network node of a first RAT and a second network node of a second RAT.

The communication system 10 further includes the WD 22 already referred to. The WD 22 may have hardware 80 that may include a radio interface 82 configured to set up and maintain a wireless connection 64 with a network node 16 serving a coverage area 18 in which the WD 22 is currently located. The radio interface 82 may be formed as or may include, for example, one or more RF transmitters, one or more RF receivers, and/or one or more RF transceivers.

The hardware 80 of the WD 22 further includes processing circuitry 84. The processing circuitry 84 may include a processor 86 and memory 88. In particular, in addition to or instead of a processor, such as a central processing unit, and memory, the processing circuitry 84 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 86 may be configured to access (e.g., write to and/or read from) memory 88, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the WD 22 may further comprise software 90, which is stored in, for example, memory 88 at the WD 22, or stored in external memory (e.g., database, storage array, network storage device, etc.) accessible by the WD 22. The software 90 may be executable by the processing circuitry 84. The software 90 may include a client application 92. The client application 92 may be operable to provide a service to a human or non-human user via the WD 22, with the support of the host computer 24. In the host computer 24, an executing host application 50 may communicate with the executing client application 92 via the OTT connection 52 terminating at the WD 22 and the host computer 24. In providing the service to the user, the client application 92 may receive request data from the host application 50 and provide user data in response to the request data. The OTT connection 52 may transfer both the request data and the user data. The client application 92 may interact with the user to generate the user data that it provides.

The processing circuitry 84 may be configured to control any of the methods and/or processes described herein and/or to cause such methods, and/or processes to be performed, e.g., by WD 22. The processor 86 corresponds to one or more processors 86 for performing WD 22 functions described herein. The WD 22 includes memory 88 that is configured to store data, programmatic software code and/or other information described herein. In some embodiments, the software 90 and/or the client application 92 may include instructions that, when executed by the processor 86 and/or processing circuitry 84, causes the processor 86 and/or processing circuitry 84 to perform the processes described herein with respect to WD 22.

Figure 2:
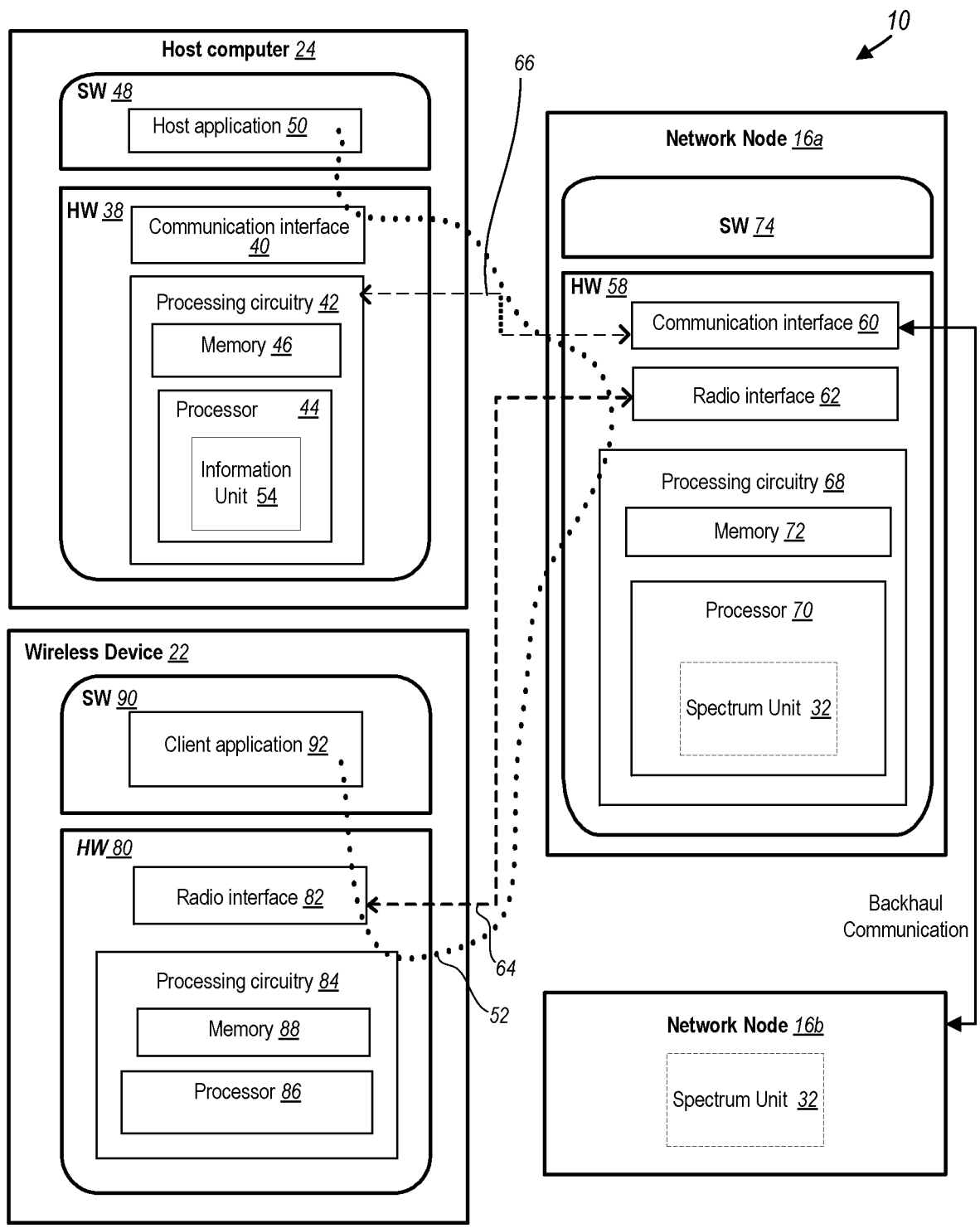
FIG. 2 is a block diagram of a host computer communicating via a network node with a wireless device over an at least partially wireless connection according to some embodiments of the present disclosure.

In some embodiments, the inner workings of the network node 16, WD 22, and host computer 24 may be as shown in FIG. 2 and independently, the surrounding network topology may be that of FIG. 1.

In FIG. 2, the OTT connection 52 has been drawn abstractly to illustrate the communication between the host computer 24 and the wireless device 22 via the network node 16, without explicit reference to any intermediary devices and the precise routing of messages via these devices. Network infrastructure may determine the routing, which it may be configured to hide from the WD 22 or from the service provider operating the host computer 24, or both. While the OTT connection 52 is active, the network infrastructure may further take decisions by which it dynamically changes the routing (e.g., on the basis of load balancing consideration or reconfiguration of the network).

The wireless connection 64 between the WD 22 and the network node 16 is in accordance with the teachings of the embodiments described throughout this disclosure. One or more of the various embodiments improve the performance of OTT services provided to the WD 22 using the OTT connection 52, in which the wireless connection 64 may form the last segment. More precisely, the teachings of some of these embodiments may improve the data rate, latency, and/or power consumption and thereby provide benefits such as reduced user waiting time, relaxed restriction on file size, better responsiveness, extended battery lifetime, etc.

In some embodiments, a measurement procedure may be provided for the purpose of monitoring data rate, latency and other factors on which the one or more embodiments improve. There may further be an optional network functionality for reconfiguring the OTT connection 52 between the host computer 24 and WD 22, in response to variations in the measurement results. The measurement procedure and/or the network functionality for reconfiguring the OTT connection 52 may be implemented in the software 48 of the host computer 24 or in the software 90 of the WD 22, or both. In embodiments, sensors (not shown) may be deployed in or in association with communication devices through which the OTT connection 52 passes; the sensors may participate in the measurement procedure by supplying values of the monitored quantities exemplified above, or supplying values of other physical quantities from which software 48, 90 may compute or estimate the monitored quantities. The reconfiguring of the OTT connection 52 may include message format, retransmission settings, preferred routing etc.; the reconfiguring need not affect the network node 16, and it may be unknown or imperceptible to the network node 16. Some such procedures and functionalities may be known and practiced in the art. In certain embodiments, measurements may involve proprietary WD signaling facilitating the host computer's 24 measurements of throughput, propagation times, latency and the like. In some embodiments, the measurements may be implemented in that the software 48, 90 causes messages to be transmitted, in particular empty or 'dummy' messages, using the OTT connection 52 while it monitors propagation times, errors etc.

Thus, in some embodiments, the host computer 24 includes processing circuitry 42 configured to provide user data and a communication interface 40 that is configured to forward the user data to a cellular network for transmission to the WD 22. In some embodiments, the cellular network also includes the network node 16 with a radio interface 62. In some embodiments, the network node 16 is configured to, and/or the network node's 16 processing circuitry 68 is configured to perform the functions and/or methods described herein for preparing/initiating/maintaining/supporting/ending a transmission to the WD 22, and/or preparing/terminating/maintaining/supporting/ending in receipt of a transmission from the WD 22.

In some embodiments, the host computer 24 includes processing circuitry 42 and a communication interface 40 that is configured to a communication interface 40 configured to receive user data originating from a transmission from a WD 22 to a network node 16. In some embodiments, the WD 22 is configured to, and/or comprises a radio interface 82 and/or processing circuitry 84 configured to perform the functions and/or methods described herein for preparing/initiating/maintaining/supporting/ending a transmission to the network node 16, and/or preparing/terminating/maintaining/supporting/ending in receipt of a transmission from the network node 16.

Although FIGS. 1 and 2 show various "units" such as spectrum unit 32 and information unit 54, as being within a respective processor, it is contemplated that these units may be implemented such that a portion of the unit is stored in a corresponding memory within the processing circuitry. In other words, the units may be implemented in hardware or in a combination of hardware and software within the processing circuitry.

FIG. 3 is a flowchart illustrating an exemplary method implemented in a communication system, such as, for example, the communication system of FIGS. 1 and 2, in accordance with one embodiment. The communication system may include a host computer 24, a network node 16 and a WD 22, which may be those described with reference to FIG. 2. In a first step of the method, the host computer 24 provides user data (Block S100). In an optional substep of the first step, the host computer 24 provides the user data by executing a host application, such as, for example, the host application 50 (Block S102). In a second step, the host computer 24 initiates a transmission carrying the user data to the WD 22 (Block S104). In an optional third step, the network node 16 transmits to the WD 22 the user data which was carried in the transmission that the host computer 24 initiated, in accordance with the teachings of the embodiments described throughout this disclosure (Block S106). In an optional fourth step, the WD 22 executes a client application, such as, for example, the client application 92, associated with the host application 50 executed by the host computer 24 (Block S108).

FIG. 4 is a flowchart illustrating an exemplary method implemented in a communication system, such as, for example, the communication system of FIG. 1, in accordance with one embodiment. The communication system may include a host computer 24, a network node 16 and a WD 22, which may be those described with reference to FIGS. 1 and 2. In a first step of the method, the host computer 24 provides user data (Block S110). In an optional substep (not shown) the host computer 24 provides the user data by executing a host application, such as, for example, the host application 50. In a second step, the host computer 24 initiates a transmission carrying the user data to the WD 22 (Block S112). The transmission may pass via the network node 16, in accordance with the teachings of the embodiments described throughout this disclosure. In an optional third step, the WD 22 receives the user data carried in the transmission (Block S114).

Figures 5, 6:
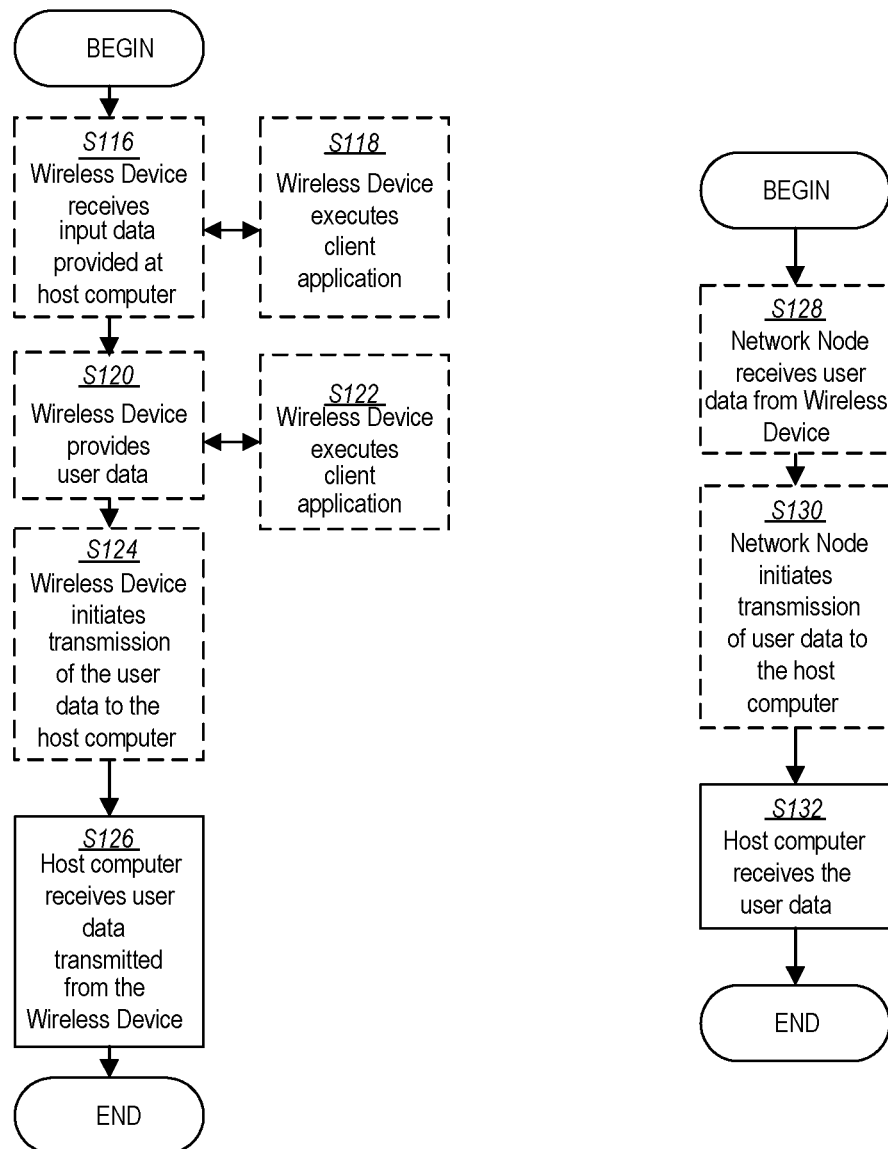
FIG. 5 is a flowchart illustrating exemplary methods implemented in a communication system including a host computer, a network node and a wireless device for receiving user data from the wireless device at a host computer according to some embodiments of the present disclosure.
FIG. 6 is a flowchart illustrating exemplary methods implemented in a communication system including a host computer, a network node and a wireless device for receiving user data at a host computer according to some embodiments of the present disclosure.

FIG. 5 is a flowchart illustrating an exemplary method implemented in a communication system, such as, for example, the communication system of FIG. 1, in accordance with one embodiment. The communication system may include a host computer 24, a network node 16 and a WD 22, which may be those described with reference to FIGS. 1 and 2. In an optional first step of the method, the WD 22 receives input data provided by the host computer 24 (Block S116). In an optional substep of the first step, the WD 22 executes the client application 92, which provides the user data in reaction to the received input data provided by the host computer 24 (Block S118). Additionally or alternatively, in an optional second step, the WD 22 provides user data (Block S120). In an optional substep of the second step, the WD provides the user data by executing a client application, such as, for example, client application 92 (Block S122). In providing the user data, the executed client application 92 may further consider user input received from the user. Regardless of the specific manner in which the user data was provided, the WD 22 may initiate, in an optional third substep, transmission of the user data to the host computer 24 (Block S124). In a fourth step of the method, the host computer 24 receives the user data transmitted from the WD 22, in accordance with the teachings of the embodiments described throughout this disclosure (Block S126).

FIG. 6 is a flowchart illustrating an exemplary method implemented in a communication system, such as, for example, the communication system of FIG. 1, in accordance with one embodiment. The communication system may include a host computer 24, a network node 16 and a WD 22, which may be those described with reference to FIGS. 1 and 2. In an optional first step of the method, in accordance with the teachings of the embodiments described throughout this disclosure, the network node 16 receives user data from the WD 22 (Block S128). In an optional second step, the network node 16 initiates transmission of the received user data to the host computer 24 (Block S130).

In a third step, the host computer 24 receives the user data carried in the transmission initiated by the network node 16 (Block S132).

Figure 7:
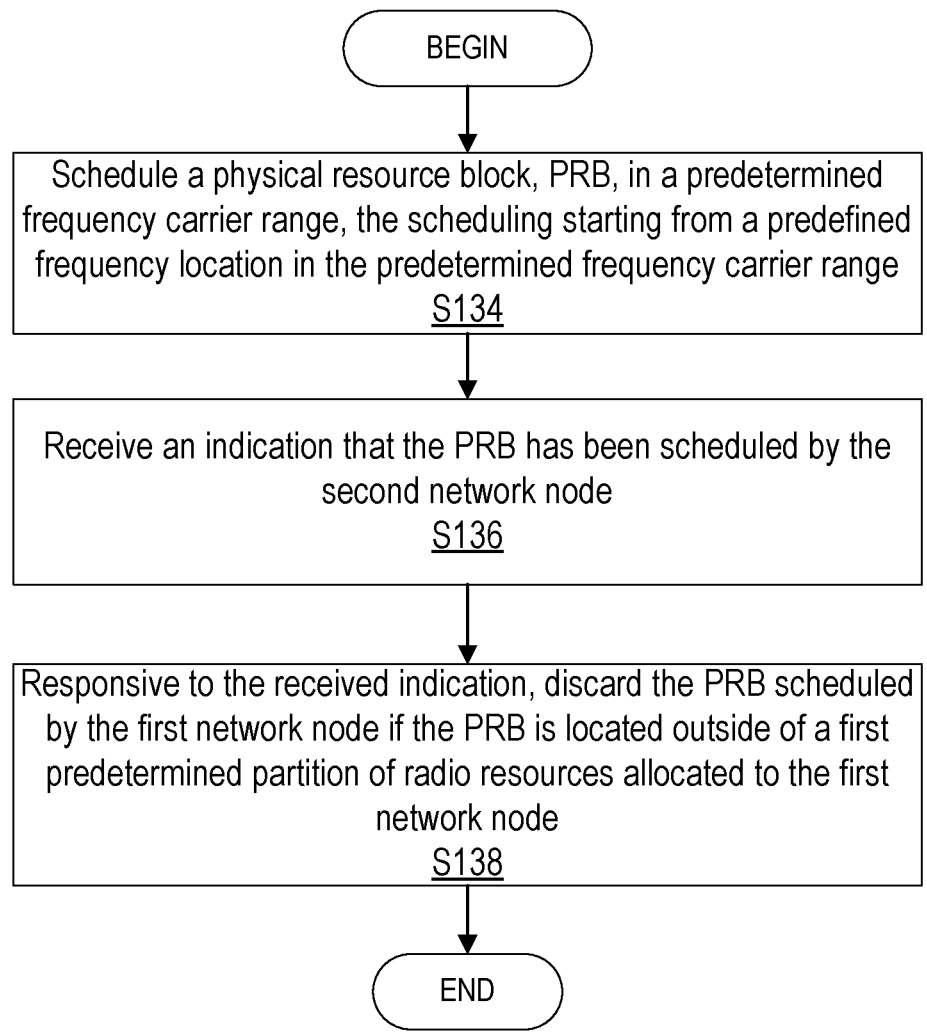
FIG. 7 is a flowchart of an exemplary process in a network node according to some embodiments of the present disclosure.

FIG. 7 is a flowchart of an exemplary process in a network node 16a according to one or more embodiments of the disclosure. FIG. 7 is described from the perspective of network node 16a (i.e., a first network node 16a) but the same steps may be performed at another network node 16. One or more Blocks and/or functions performed by network node 16 may be performed by one or more elements of network node 16 such as by spectrum unit 32 in processing circuitry 68, processor 70, radio interface 62, etc. In one or more embodiments, network node 16 such as via one or more of processing circuitry 68, processor 70, communication interface 60, spectrum unit 32 and radio interface 62 is configured to schedule (Block S134) a physical resource block, PRB, in a predetermined frequency carrier range where the scheduling starts from a predefined frequency location in the predetermined frequency carrier range, as described herein.

In one or more embodiments, network node 16 such as via one or more of processing circuitry 68, processor 70, communication interface 60, spectrum unit 32 and radio interface 62 is configured to receive (Block136) an indication that the PRB has been scheduled by the second network node 16b as described herein. In one or more embodiments, network node 16 such as via one or more of processing circuitry 68, processor 70, communication interface 60, spectrum unit 32 and radio interface 62 is configured to, responsive to the received indication, discard (Block S138) the PRB scheduled by the first network node 16a if the PRB is located outside of a first predetermined partition of radio resources allocated to the first network node 16a, as described herein.

In one or more embodiments, the processing circuitry 68 is further configured to, if the PRB is located within the first predetermined partition of radio resources, cause transmission using the PRB scheduled by the first network node 16a. In one or more embodiments, the scheduling of the PRB in the predetermined frequency carrier range is independent of the scheduling of the PRB by the second network node 16b. In one or more embodiments, the processing circuitry 68 is further configured to, if the PRB is located outside the first partition, and if the indication that the PRB has been scheduled by the second network node 16b has not been received within a predetermined timeout period, discard the PRB scheduled by the first network node 16a. In one or more embodiments, the processing circuitry 68 is further configured to receive an indication that the PRB has not been scheduled by the second network node 16b, and responsive to the received indication, cause transmission using the PRB scheduled by the first network node 16a. In one or more embodiments, the predetermined frequency carrier range includes at least two predetermined partitions of radio resources including the first predetermined partition of radio resources, the at least two predetermined partitions of radio resources being non-overlapping partitions.

In one or more embodiments, the at least two predetermined partitions of radio resource are determined based at least in part on resource usage during a predefined time period. In one or more embodiments, the predefined time period corresponds to one of N transmissions for a wireless device 22 and N slots. In one or more embodiments, the at least two predetermined partitions are determined for every predefined time period. In one or more embodiments, the processing circuitry 68 is further configured to provide an indication of the scheduling of the PRB by the first network node 16a to the second network node 16b. In one or more embodiments, the predefined frequency location in the predetermined frequency carrier range corresponds to one end of the predetermined frequency carrier range, the scheduling by the first network node 16a progressing toward an opposite end of the predetermined frequency carrier range.

In one or more embodiments, a computer readable medium, e.g. memory 72, is configured to store instructions that, when executed by a processor 70, cause the processor 70 to perform one or more network node 16 functions as described herein. For example, in one or more embodiments, a computer readable medium, e.g. memory 72, is configured to store instructions that, when executed by a processor 70, cause the processor 70 to: schedule, by a first network node 16a, a physical resource block, PRB, in a predetermined frequency carrier range, where the scheduling starts from a predefined frequency location in the predetermined frequency carrier range; receive an indication that the PRB has been scheduled by a second network node 16b; and responsive to the indication, discard the PRB scheduled by the first network node 16a if the PRB is located outside of a first predetermined partition of radio resources allocated to the first network node 16a.

Having generally described arrangements for at least supporting dynamic spectrum sharing (DSS) between loosely coupled network nodes such as between a first network node of a first RAT and a second network node of a second RAT, details for these arrangements, functions and processes are provided as follows, and which may be implemented by the network node 16, wireless device 22 and/or host computer 24.

Embodiments provide at least supporting dynamic spectrum sharing (DSS) between loosely coupled network nodes such as between a first network node of a first RAT and a second network node of a second RAT.

Example 1: Network Node 16a (e.g., eNb, First Network Node 16a) and Network node 16b (e.g., gNB, Second Network Node 16b) Independently Scheduling Resources From the Opposite End of Carrier Frequency Range Each of network node 16b and network node 16a has an allocated partition of radio resources. The resource partitioning between the first RAT (e.g., LTE) and second RAT (e.g., NR) is slowly changing based on statistical usage history.

The network node 16b and network node 16a schedule such as via one or more of processing circuitry 68, processor 70, radio interface 62, spectrum unit 32, etc., at respective network node 16 the radio resources independently, assuming they have access to the entire pool of radio resources (except for some of the LTE control radio resources that may always required by the network node 16a).

Figure 8:
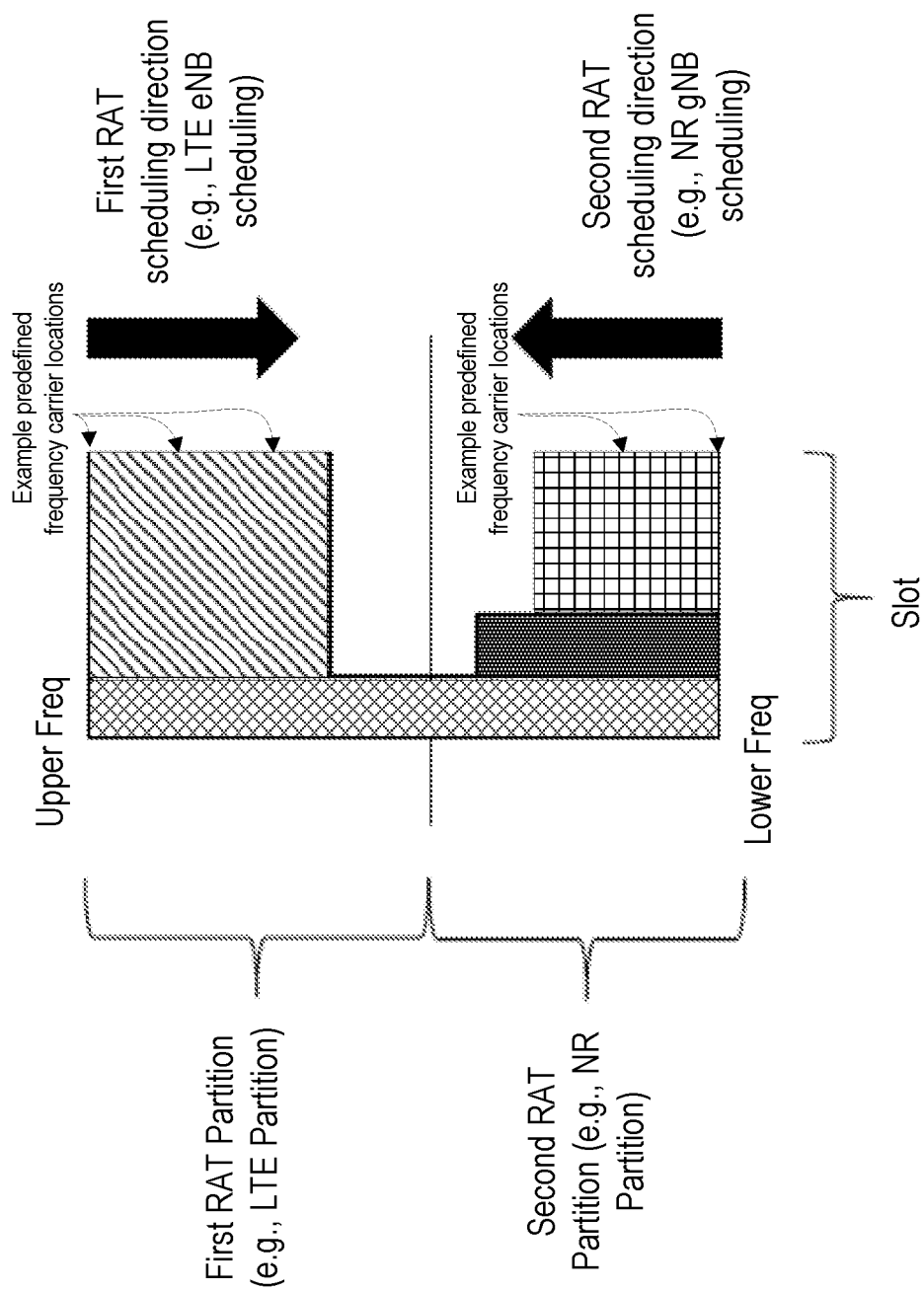
FIG. 8 is a diagram of a shared carrier configuration between a first RAT and a second RAT according to some embodiments of the present disclosure.

To facilitate independent scheduling, each network node 16a and 16b is scheduling PRBs from the opposite end of the carrier frequency range as illustrated in FIG. 8 where a frequency carrier is shared between the network nodes 16a and 16b associated with two RATs. In FIG. 8, for example, an NR slot matches an LTE subframe in time duration. For example, network node 16a (e.g., LTE eNB) may start schedule resources at a predefined frequency carrier location in a first predetermined frequency carrier range (e.g., first RAT partition) and schedule resources in RAT direction such as the direction(s) indicated in FIG. 8, for example, where the predefined frequency carrier location may be located at one end of the first RAT (e.g., LTE) partition or at another location within the first RAT partition. In another example, network node 16b (e.g., NR gNB) may start schedule resources at a predefined frequency carrier location in a second predetermined frequency carrier range (e.g., second RAT partition) where the predefined frequency carrier location may be located at one end of the second RAT (e.g., NR) partition or at another location within the second RAT partition. While the first RAT and second RAT partitions are shown as being equal to each other, in one or more embodiments, the partitions may, or may not, be equal to each other.

Figure 9:
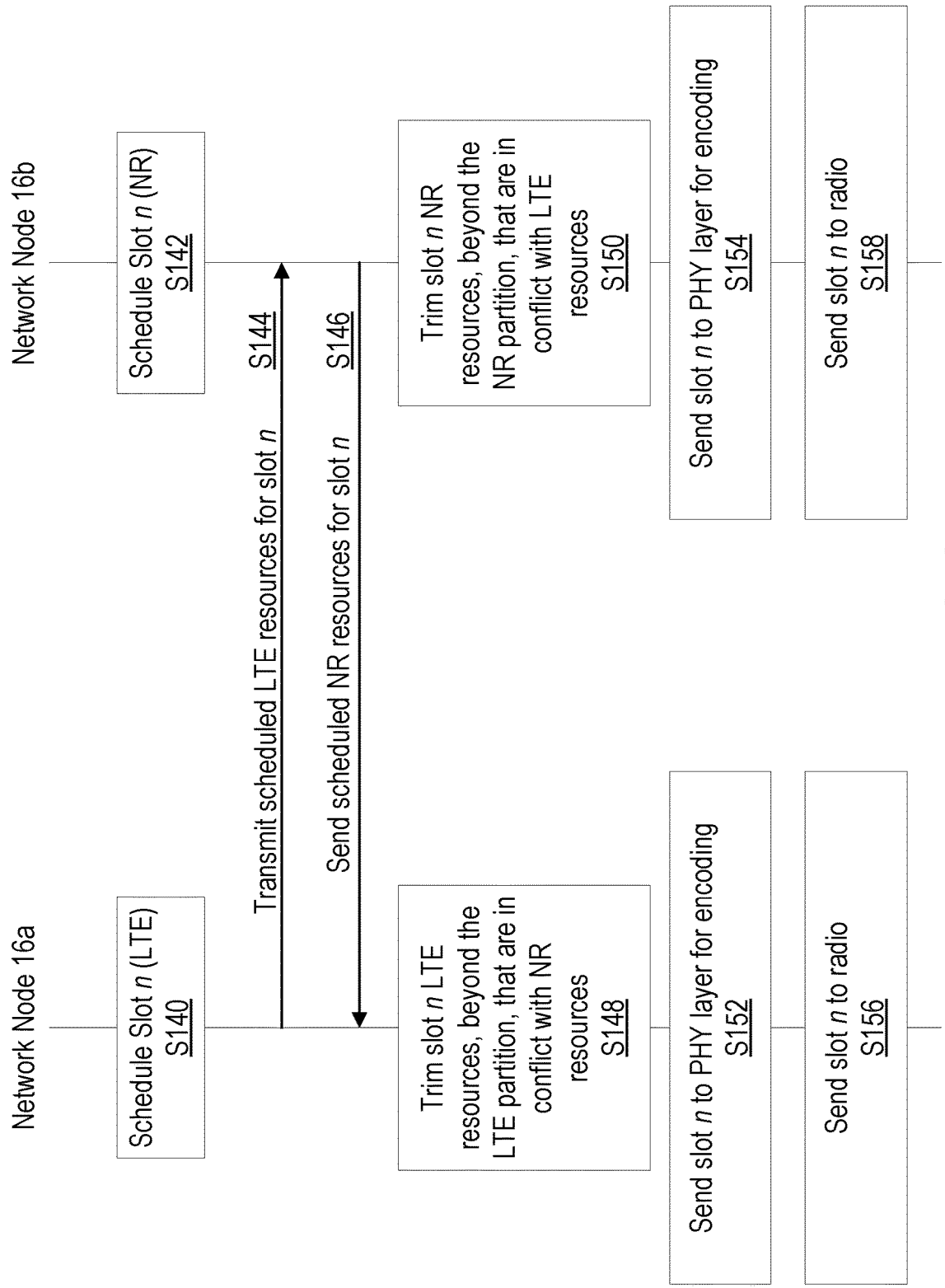
FIG. 9 is a signaling diagram of messages exchanged between a first network node and a second network node according to some embodiments of the present disclosure.

For each slot, the network nodes 16a and 16b report such as via one or more of processing circuitry 68, processor 70, radio interface 62, spectrum unit 32, etc., the amount of scheduled resources, i.e., amount of resources each has independently scheduled form the other network node 16. The network nodes 16a and 16b may discard such as via one or more of processing circuitry 68, processor 70, radio interface 62, spectrum unit 32, etc., any scheduled data and/or control PRBs that are in conflict, i.e., that overlap or are scheduled on the same resources, as illustrated in FIG. 9. One or more blocks in FIG. 9 may be performed in an order different than the order described below and/or shown in FIG. 9. In particular, FIG. 9 is a signaling diagram illustrating messages exchanged between network node 16a (e.g., eNB) and network node 16b (e.g., gNB). For example, network node 16a such as via one or more of processing circuitry 68, processor 70, radio interface 62, spectrum unit 32, etc., is configured to schedule (Block S140) slot n such as for data and/or control information associated with LTE transmission, as described herein. Network node 16b such as via one or more of processing circuitry 68, processor 70, radio interface 62, spectrum unit 32, etc., is configured to schedule (Block S142) slot n for data and/or control information associated with NR transmission, as described herein.

Network node 16a such as via one or more of processing circuitry 68, processor 70, radio interface 62, spectrum unit 32, etc., is configured to cause transmission or transmit (Block S144) an indication of scheduled LTE resources for slot n to network node 16b, i.e. transmit an indication of resources scheduled in Block S140, as described herein. Network node 16b such as via one or more of processing circuitry 68, processor 70, radio interface 62, spectrum unit 32, etc., is configured to transmit or cause transmission (Block S146) an indication of scheduled NR resources for slot n to network node 16a, i.e. transmit an indication of resources scheduled in Block S142, as described herein.

Network node 16a such as via one or more of processing circuitry 68, processor 70, radio interface 62, spectrum unit 32, etc., is configured to trim (Block S148) slot n LTE resources, beyond the LTE partition, that are in conflict with NR resources, as described herein. As used herein, trim may refer to one or more of removing, replacing, discarding, un-scheduling, etc. of one or more resources.

Network node 16b such as via one or more of processing circuitry 68, processor 70, radio interface 62, spectrum unit 32, etc., is configured to trim (Block S150) slot n NR resources, beyond the NR partition, that are in conflict with LTE resources, as described herein. As used herein, trim may refer to one or more of removing, replacing, discarding, un-scheduling, etc. of one or more resources. Network node 16a such as via one or more of processing circuitry 68, processor 70, radio interface 62, spectrum unit 32, etc., is configured to send (Block S152) slot n to PHY layer for encoding. Network node 16b such as via one or more of processing circuitry 68, processor 70, radio interface 62, spectrum unit 32, etc., is configured to send (Block S154) slot n to PHY layer for encoding.

Network node 16b such as via one or more of processing circuitry 68, processor 70, radio interface 62, spectrum unit 32, etc., is configured to send (Block S154) slot n to PHY layer for encoding. Network node 16a such as via one or more of processing circuitry 68, processor 70, radio interface 62, spectrum unit 32, etc., is configured to send (Block S156) slot n to the radio (e.g., radio interface 62) for transmission. Network node 16b such as via one or more of processing circuitry 68, processor 70, radio interface 62, spectrum unit 32, etc., is configured to send (Block S158) slot n to the radio (e.g., radio interface 62) for transmission.

In one or more embodiments, if the network node 16a has scheduled less resources than available in the LTE (i.e., first RAT) partition, network node 16a does not have to wait to receive the message from network node 16b (e.g., gNB) before sending the slot to the PHY layer for encoding. Network node 16b may perform the same determination/action but with respect to the NR partition, i.e., if network node 16b schedules less resources than NR (i.e., second RAT) partition.

In one or more embodiments, if the network node 16a (e.g., eNB) schedules more resources than the ones available in the LTE partition and the message from peer network node 16b (e.g., gNB) is late or not received at all, the network node 16a can proceed by trimming all resources in excess of the LTE partition and then sending the slot to the lower layers. The same process may be performed by network node 16b but with respect to NR resources such that in case more NR resources are scheduled than available in NR partition and the message from network node 16a is late, network node 16b may proceed by trimming all resources in excess of the NR partition and then send the slot to the lower layers.

Example 2: Changing the Second RAT (e.g., NR) and First RAT (e.g., LTE) Partition Size Based on Usage During the Previous N Slots In one or more embodiments, the approach is to change the partition size for the first RAT and second RAT every N slots based at least in part on the usage during the previous N slots. The following is an example formula that can be used for partition size update:

$$NR_{Partition\%} = \frac{NR_{AvRR}}{NR_{AvRR} + LTE_{AvRR}}; \quad LTE_{Partition\%} = \frac{LTE_{AvRR}}{NR_{AvRR} + LTE_{AvRR}}$$

where $LTE_{AvRR}$ is the average of the Radio Resources scheduled by network node 16a during the previous N slots (including the Radio Resources that were trimmed later due to conflict with the scheduling of second RAT resources), and $NR_{AvRR}$ is the average of the Radio Resources scheduled by NR during the previous N slots(including the Radio Resources that were trimmed later due to conflict with the scheduling of first RAT resources).

A minimum and maximum size for first RAT and second RAT partitions may be enforced by, for example, respective network nodes 16. For example, one or more predefined rules may be used for the minimum and/or maximum size such as a rule defining that a minimum size for a partition is 5% of available PRBs.

The formula above can also be weighted to allow an asymmetric distribution of resources between the first RAT and the second RAT as illustrated below:

$$NR_{Partition\%} = \frac{w_{NR} * NR_{AvRR}}{w_{NR} * NR_{AvRR} + w_{LTE} * LTE_{AvRR}};$$

$$LTE_{Partition\%} = \frac{w_{LTE} * LTE_{AvRR}}{w_{NR} * NR_{AvRR} + w_{LTE} * LTE_{AvRR}}$$

where $w_{LTE}$ is the weight of first RAT partition and WNR is the weight of second RAT partition, and $w_{LTE}+w_{LTE}=1$. For example, one RAT can be favored over the other RAT by using a higher weight.

Figure 10:
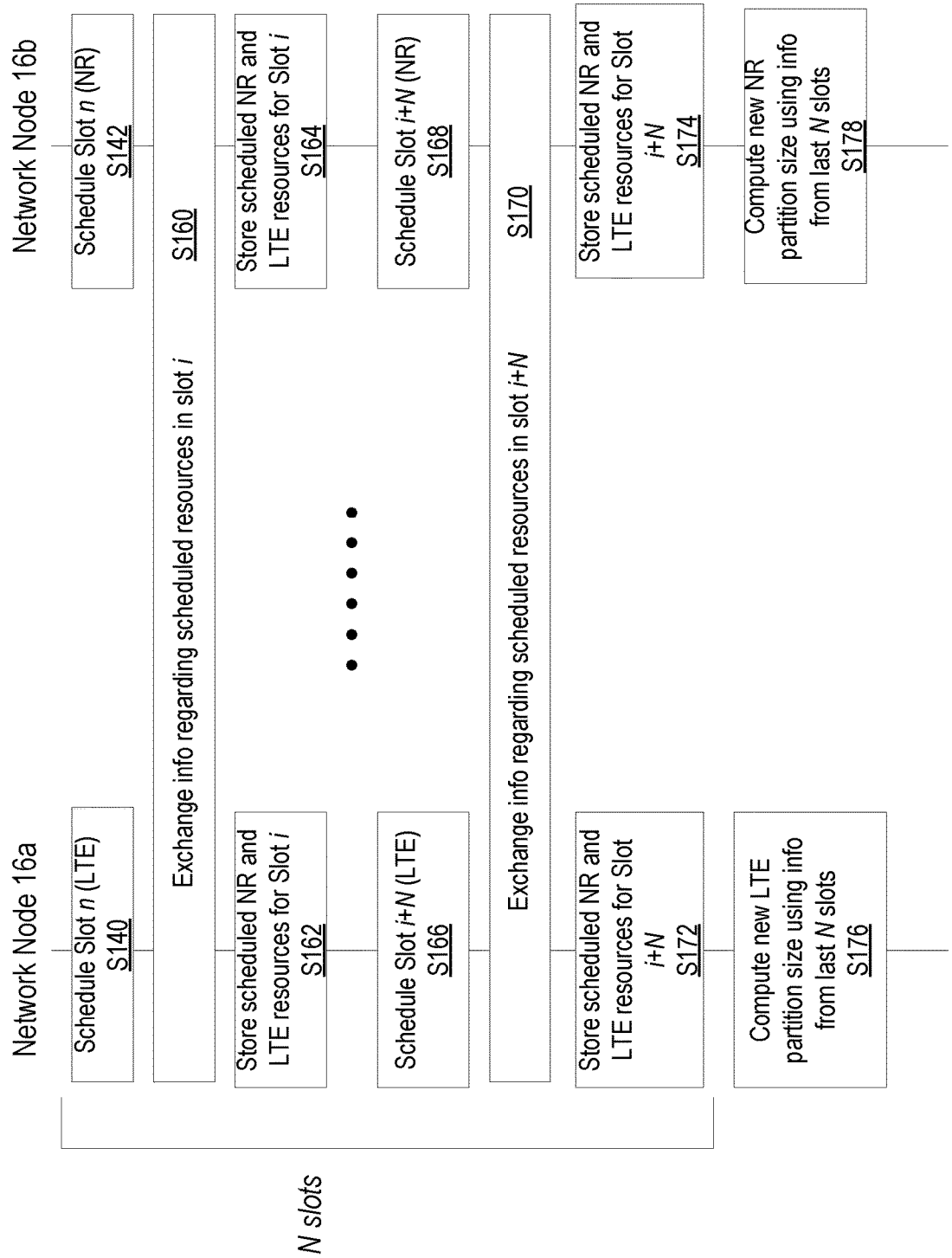
FIG. 10 is a signaling diagram of first RAT and second RAT partition sizes computed every N slots according to some embodiments of the present disclosure.

Due to the information exchange, both the network node 16a and network node 16b may have access to the scheduled resources for both the first RAT and second RAT such that these network nodes 16a and 16b can compute the partition updates independently as illustrated in FIG. 10 that is discussed below.

In one or more embodiments, the one or more partitions may be fixed. In one or more embodiments, the partitions may be allocated or based on transmission time interval such that one TTI may be used by the first RAT while the second TTI may be used by the second RAT, for example. Other partition algorithms may be used in accordance with the teachings of the disclosure.

FIG. 10 is a signaling diagram of first RAT and second RAT partition sizes computed every N slots according to some embodiments of the present disclosure. Blocks S140 and S142 as described with respect to FIG. 9. Network nodes 16a and 16b such as via one or more of processing circuitry 68, processor 70, radio interface 62, spectrum unit 32, etc., are configured to exchange (Block S160) information regarding scheduling resources in slot i with each other as described herein. Network node 16a such as via one or more of processing circuitry 68, processor 70, radio interface 62, spectrum unit 32, etc., is configured to store (Block S162) scheduled NR and LTE resources for slot i as described herein. Network node 16b such as via one or more of processing circuitry 68, processor 70, radio interface 62, spectrum unit 32, etc., is configured to store (Block S164) scheduled NR and LTE resources for slot i as described herein.

Network node 16a such as via one or more of processing circuitry 68, processor 70, radio interface 62, spectrum unit 32, etc., is configured to schedule (Block S166) slot i+N for LTE resources as described herein. Network node 16b such as via one or more of processing circuitry 68, processor 70, radio interface 62, spectrum unit 32, etc., is configured to schedule (Block S168) slot i+N for LTE resources as described herein. Network nodes 16a and 16b such as via one or more of processing circuitry 68, processor 70, radio interface 62, spectrum unit 32, etc., are configured to exchange (Block S170) information regarding scheduled resources in slot i+N with each other as described herein.

Network node 16a such as via one or more of processing circuitry 68, processor 70, radio interface 62, spectrum unit 32, etc., is configured to store (Block S172) scheduled NR and LTE resources for slot i+N as described herein. Network node 16b such as via one or more of processing circuitry 68, processor 70, radio interface 62, spectrum unit 32, etc., is configured to store (Block S174) scheduled NR and LTE resources for slot i+N as described herein.

Network node 16a such as via one or more of processing circuitry 68, processor 70, radio interface 62, spectrum unit 32, etc., is configured to compute (Block S176) new LTE partition size using information from last N slots as described herein. Network node 16b such as via one or more of processing circuitry 68, processor 70, radio interface 62, spectrum unit 32, etc., is configured to compute (Block S178) new NR partition size using information from last N slots as described herein.

In one or more embodiments, if a slot information message is lost between network node 16a and network node 16b, in the next slot information exchange between network nodes 16a and 16b, the network node 16a and 16b may alert its peer network node 16a and 16b that it has missing information and can no longer compute the partition size update. In one or more embodiments, to address this scenario, the network nodes 16a and 16b can start a new sequence of N slots before the next partition size update.

In one or more embodiments, when, over multiple N slot groups, both the second RAT and first RAT consistently required more radio resources, than the resources available in their respective partition, the network operator can be notified that more spectrum may be needed to solve the overload situation.

Example 3: Changing the Second RAT (e.g., NR) and First RAT (e.g., LTE) Partition Size Based on a Rolling Window Over the Last N Transmissions, Plus Adding a Measure of Volatility In one or more embodiments, an alternative of managing the partition size between the first RAT and second RAT is provided where a rolling window over the last N transmissions for the wireless device 22 is used. The rolling or shifting logical window may help reflect the TCP time scales better. Additionally, a measure for the volatility can be introduced when determining the partitions. For example, adding rolling 1 sigma (i.e., standard deviation) across the last N transmissions may reduce collisions to less than 1%.

For helping guarantee fast access to the system, a minimum number of PRBs may need to be reserved in all cases, even if a RAT did not have any transmissions before. In one or more embodiments, 2 to 4 PRBs can be used as minimum allocation in DL. In one or more embodiments, example 3 may provide a more accurate partition than the other examples as example 3 may be more accurate to what partitions are needed.

The teachings described herein are applicable to networks operating with two or more different RATs. For example, the system bandwidth may be divided between N partitions for N RATS where N is an integer greater than 1. In one example where N=3 or more, the predefined frequency location for where to start allocation/scheduling in a partition may be the middle frequency point of the partition for each partition as opposed to the one end of the partition as was described above with N=2. Other variations are possible accordance with the teachings of the disclosure.

Therefore, one or more embodiments of the disclosure provide for a less complex and dynamic way/method/process of providing and supporting DSS between a network node 16a of a first RAT and a network node 16b of a second RAT. Further, the teachings described herein are applicable to systems where there is medium to high delay between the network nodes 16, i.e., medium to high delay in the backhaul, which may be an issue for existing DSS systems that may require low delay. Further, the teachings of the disclosure may help a network adapt to changes in quantity and type of wireless device 22. For example, if initially there are only a few NR wireless devices 22, less NR resources may be used while allowing for a greater number of LTE resources to be used. However, as the network environment changes such as if a quantity of NR wireless device 22 starts to become greater than a quantity of LTE wireless devices 22, the network may reallocate spectrum to NR wireless devices 22 as described herein.

As will be appreciated by one of skill in the art, the concepts described herein may be embodied as a method, data processing system, computer program product and/or computer storage media storing an executable computer program. Accordingly, the concepts described herein may take the form of an entirely hardware embodiment, an entirely software embodiment or an embodiment combining software and hardware aspects all generally referred to herein as a "circuit" or "module." Any process, step, action and/or functionality described herein may be performed by, and/or associated to, a corresponding module, which may be implemented in software and/or firmware and/or hardware. Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer (to thereby create a special purpose computer), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

Abbreviations that may be used in the preceding description include:
DSS Dynamic Spectrum Sharing
RAT Radio Access Technology It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

What is claimed is:

1. A first network node of a first radio access technology, RAT, configured to communicate with a second network node of a second RAT different from the first RAT, the first network node comprising processing circuitry configured to:
schedule a physical resource block, PRB, in a predetermined frequency carrier range, the scheduling starting from a predefined frequency location in the predetermined frequency carrier range;
receive an indication that the PRB has been scheduled by the second network node; and
responsive to the received indication, discard the PRB scheduled by the first network node if the PRB is located outside of a first predetermined partition of radio resources allocated to the first network node.

2. The first network node of claim 1, wherein the processing circuitry is further configured to, if the PRB is located within the first predetermined partition of radio resources, cause transmission using the PRB scheduled by the first network node.

3. The first network node of claim 1, wherein the scheduling of the PRB in the predetermined frequency carrier range is independent of the scheduling of the PRB by the second network node.

4. The first network node of claim 1, wherein the processing circuitry is further configured to, if the PRB is located outside the first partition, and if the indication that the PRB has been scheduled by the second network node has not been received within a predetermined timeout period, discard the PRB scheduled by the first network node.

5. The first network node of claim 1, wherein the processing circuitry is further configured to:
receive an indication that the PRB has not been scheduled by the second network node; and
responsive to the received indication, cause transmission using the PRB scheduled by the first network node.

6. The first network node of claim 1, wherein the predetermined frequency carrier range includes at least two predetermined partitions of radio resources including the first predetermined partition of radio resources, the at least two predetermined partitions of radio resources being non-overlapping partitions.

7. The first network node of claim 6, wherein the at least two predetermined partitions of radio resource are determined based at least in part on resource usage during a predefined time period.

8. The first network node of claim 7, wherein the predefined time period corresponds to one of N transmissions for a wireless device and N slots.

9. The first network node of claim 7, wherein the at least two predetermined partitions are determined for every predefined time period.

10. The first network node of claim 1, wherein the processing circuitry is further configured to provide an indication of the scheduling of the PRB by the first network node to the second network node.

11. The first network node of claim 1, wherein the predefined frequency location in the predetermined frequency carrier range corresponds to one end of the predetermined frequency carrier range, the scheduling by the first network node progressing toward an opposite end of the predetermined frequency carrier range.

12. A method implemented by a first network node of a first radio access technology, RAT, configured to communicate with a second network node of a second RAT different from the first RAT, the method comprising:
scheduling a physical resource block, PRB, in a predetermined frequency carrier range, the scheduling starting from a predefined frequency location in the predetermined frequency carrier range;
receiving an indication that the PRB has been scheduled by the second network node; and
responsive to the indication, discarding the PRB scheduled by the first network node if the PRB is located outside of a first predetermined partition of radio resources allocated to the first network node.

13. The method of claim 12, further comprising, if the PRB is located within the first predetermined partition of radio resources, causing transmission using the PRB scheduled by the first network node.

14. The method of claim 12, wherein the scheduling of the PRB in the predetermined frequency carrier range is independent of the scheduling of the PRB by the second network node.

15. The method of claim 12, further comprising, if the PRB is located outside the first partition, and if the indication that the PRB has been scheduled by the second network node has not been received within a predetermined timeout period, discard the PRB scheduled by the first network node.

16. The method of claim 12, further comprising:
receiving an indication that the PRB has not been scheduled by the second network node; and
responsive to the received indication, causing transmission using the PRB scheduled by the first network node.

17. The method of claim 12, wherein the predetermined frequency carrier range includes at least two predetermined partitions of radio resources including the first predetermined partition of radio resources, the at least two predetermined partitions of radio resources being non-overlapping partitions.

18. The method of claim 17, wherein the at least two predetermined partitions of radio resource are determined based at least in part on resource usage during a predefined time period.

19. The method of claim 18, wherein the predefined time period corresponds to one of N transmissions for a wireless device and N slots.

20. The method of claim 18, wherein the at least two predetermined partitions are determined for every predefined time period.

21. The method of claim 12, further comprising providing an indication of the scheduling of the PRB by the first network node to the second network node.

22. The method of claim 12, wherein the predefined frequency location in the predetermined frequency carrier range corresponds to one end of the predetermined frequency carrier range, the scheduling by the first network node progressing toward an opposite end of the predetermined frequency carrier range.

23. A non-transitory computer readable medium configured to store instructions that, when executed by a processor, cause the processor to:

schedule, by a first network node, a physical resource block, PRB, in a predetermined frequency carrier range, the scheduling starting from a predefined frequency location in the predetermined frequency carrier range;

receive an indication that the PRB has been scheduled by a second network node; and responsive to the indication, discard the PRB scheduled by the first network node if the PRB is located outside of a first predetermined partition of radio resources allocated to the first network node.

* * * * *